US012128723B2

(12) United States Patent
D'Orazio et al.

(10) Patent No.: US 12,128,723 B2
(45) Date of Patent: Oct. 29, 2024

(54) WEAR SLEEVE FOR A SHOCK BODY (71) Applicant: Fox Factory, Inc., Braselton, GA (US)

(72) Inventors: Nick D'Orazio, Soquel, CA (US);
Michael R. Labbe, Scotts Valley, CA (US); Grant Skognes, Scotts Valley, CA (US); Rick Strickland, Dacula, GA (US)

(73) Assignee: Fox Factory, Inc., Duluth, GA (US)

( * ) Notice: Subject to any disclaimer, the term of this patent is extended or adjusted under 35 U.S.C. 154(b) by 10 days.

(21) Appl. No.: 17/213,078

(22) Filed: Mar. 25, 2021

(65) Prior Publication Data

US 2021/0300139 A1    Sep. 30, 2021

Related U.S. Application Data (60) Provisional application No. 63/001,057, filed on Mar. 27, 2020.

(51) Int. Cl.
*B60G 15/06* (2006.01)
*F16F 9/38* (2006.01)
*F16F 13/00* (2006.01)

(52) U.S. Cl.
CPC ......... *B60G 15/063* (2013.01); *B60G 15/065* (2013.01); *F16F 9/38* (2013.01); *F16F 13/007* (2013.01); *B60G 2202/312* (2013.01); *B60G 2204/1242* (2013.01); *B60G 2206/7101* (2013.01); *B60G 2206/72* (2013.01); *B60G 2800/162* (2013.01); *F16F 2224/0208* (2013.01); *F16F 2224/0241* (2013.01); *F16F 2230/0023* (2013.01); *F16F 2232/08* (2013.01)

(58) Field of Classification Search
CPC ............... B60G 15/063; B60G 15/065; B60G 2202/1312; B60G 2204/1242; B60G 2206/7101; B60G 2206/72; B60G 2800/162; F16F 9/38; F16F 13/007; F16F 2224/0208; F16F 2224/0241; F16F 2230/0023; F16F 2232/08
See application file for complete search history.

(56) References Cited

U.S. PATENT DOCUMENTS

| 2,896,938 | A | * | 7/1959 | Walker | ................... | B60G 15/02 |
| | | | | | | 267/221 |
| 2,902,274 | A | | 9/1959 | McIntyre | | |
| 3,157,393 | A | * | 11/1964 | McIntyre | ................ | F16F 13/02 |
| | | | | | | 267/225 |

(Continued)

FOREIGN PATENT DOCUMENTS

| DE | 102007060085 A1 | 6/2009 |
| EP | 0259010 A2 | 3/1988 |

(Continued)

OTHER PUBLICATIONS

European Search Report for European Application No. 21165231.8, 16 pages, Aug. 3, 2021 (Aug. 31, 2021).

*Primary Examiner* — Bradley T King
*Assistant Examiner* — James K Hsiao (57) ABSTRACT A wear sleeve for a shock body is disclosed. The wear sleeve inner diameter (ID) that is larger than an outer diameter (OD) of a shock body. A wear sleeve OD that is smaller than a spring coupler ID, such that the wear sleeve will fit about the outside of said shock body and between the shock body and the spring coupler.

4 Claims, 7 Drawing Sheets (56) References Cited

U.S. PATENT DOCUMENTS

| | | | | |
|---|---|---|---|---|
| 3,263,983 A * | 8/1966 | Bliven | B60G 13/003 267/225 |
| 3,752,498 A * | 8/1973 | Shea | B60G 17/04 280/124.159 |
| 3,892,397 A * | 7/1975 | Nicholls | B60G 15/063 267/195 |
| 3,893,702 A * | 7/1975 | Keijzer | B60G 15/07 267/221 |
| 3,951,391 A * | 4/1976 | Papousek | B60G 13/001 267/218 |
| 4,436,118 A * | 3/1984 | Garrett | F16L 57/00 175/325.1 |
| 4,521,002 A | 6/1985 | Adorjan et al. | |
| 5,316,113 A * | 5/1994 | Yamaoka | F16F 9/3484 188/320 |
| 5,454,550 A * | 10/1995 | Christopherson | B60G 15/062 267/221 |
| 5,477,948 A * | 12/1995 | Stevens | B60G 17/021 267/221 |
| 5,961,106 A * | 10/1999 | Shaffer | B60G 13/008 267/221 |
| 5,996,982 A * | 12/1999 | Bell | F16F 13/00 267/221 |
| 7,163,216 B2 * | 1/2007 | McLaughlin | B60G 7/003 403/46 |
| 7,216,861 B1 | 5/2007 | Labarbera | |
| 7,293,764 B2 * | 11/2007 | Fang | B60G 17/021 267/220 |
| 7,527,252 B2 * | 5/2009 | Oohashi | F16F 1/13 267/170 |
| 8,196,942 B2 * | 6/2012 | Heeren | B60G 13/006 280/124.1 |
| 9,027,938 B1 * | 5/2015 | Kasian | B60G 17/00 267/221 |
| 9,162,548 B1 * | 10/2015 | Wakeman | F16F 1/121 |
| 9,174,504 B1 * | 11/2015 | Powell | B60G 7/003 |
| 9,605,726 B2 * | 3/2017 | Baldoni | F16F 9/49 |
| 9,686,899 B2 * | 6/2017 | Kovach | A01B 33/025 |
| 9,822,837 B2 * | 11/2017 | Groves | B60G 13/08 |
| 10,577,018 B2 | 3/2020 | Urbanski et al. | |
| 2002/0038929 A1 * | 4/2002 | Now | B60G 17/021 267/217 |
| 2005/0189685 A1 | 9/2005 | Verriet | |
| 2007/0144844 A1 | 6/2007 | Riley et al. | |
| 2009/0120277 A1 * | 5/2009 | Adams | F41A 11/00 89/179 |
| 2015/0114774 A1 * | 4/2015 | Kim | F16F 9/3485 188/322.15 |
| 2015/0192185 A1 * | 7/2015 | Hansen | F16F 9/38 188/322.12 |
| 2016/0185177 A1 * | 6/2016 | Kaneko | B60G 15/063 267/221 |
| 2016/0230835 A1 * | 8/2016 | Groves | F16F 9/165 |

FOREIGN PATENT DOCUMENTS

| | | |
|---|---|---|
| JP | 3048245 U | 5/1998 |
| JP | 2002139087 A | 5/2002 |
| JP | 2019002459 A | 1/2019 |

* cited by examiner

WEAR SLEEVE FOR A SHOCK BODY

CROSS-REFERENCE TO RELATED APPLICATIONS (PROVISIONAL)

This application claims priority to and benefit of U.S. Provisional Patent Application No. 63/001,057 filed on Mar. 27, 2020, entitled "SHOCK BODY WEAR SLEEVE" by Nick D'Orazio et al., and assigned to the assignee of the present application, the disclosure of which is hereby incorporated by reference in its entirety.

FIELD OF THE INVENTION

Embodiments of the invention generally relate to methods and apparatus for use in vehicle suspension.

BACKGROUND

Suspension assemblies are utilized on power sport vehicles to absorb energy imparted to one or more wheels (or hull) by the terrain over which the vehicle is being driven. The use of a suspension shock system allows a rider to traverse terrain, at a greater speed and with less fatigue.

In general, a shock assembly includes an outer shock body, a number of components within the outer shock body, a spring coupler external to the shock body, and one or more external shock springs. Presently, as power sport vehicles use is growing in popularity and expanding in range and capability, there is a growing need for wear resistance between the shock body and the spring coupler.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Embodiments disclosed herein, provide a wear sleeve that is placed outside of the shock body and between the shock body and at least a spring coupler to provide previously unavailable levels of wear resistance for the shock body. In one embodiment, the shock assemblies discussed herein are used in applications such as bicycles, motorcycles, all-terrain vehicles (ATV), Side-by-Sides, utility vehicles (UTV), snowmobiles, scooters, recreational off-highway vehicles (ROV), multipurpose off-highway utility vehicles (MOHUV), personal watercrafts (PWC), and the like. However, it should be appreciated that the wear sleeve can be used with almost any single spring or multi spring damper.

In one embodiment, the wear sleeve is a modular component or set of components that slides over existing shock bodies. In one embodiment, the modular design allows the wear sleeve to be retroactively added to existing shock assemblies as well as being used in new shock assemblies.

Figure 1A:
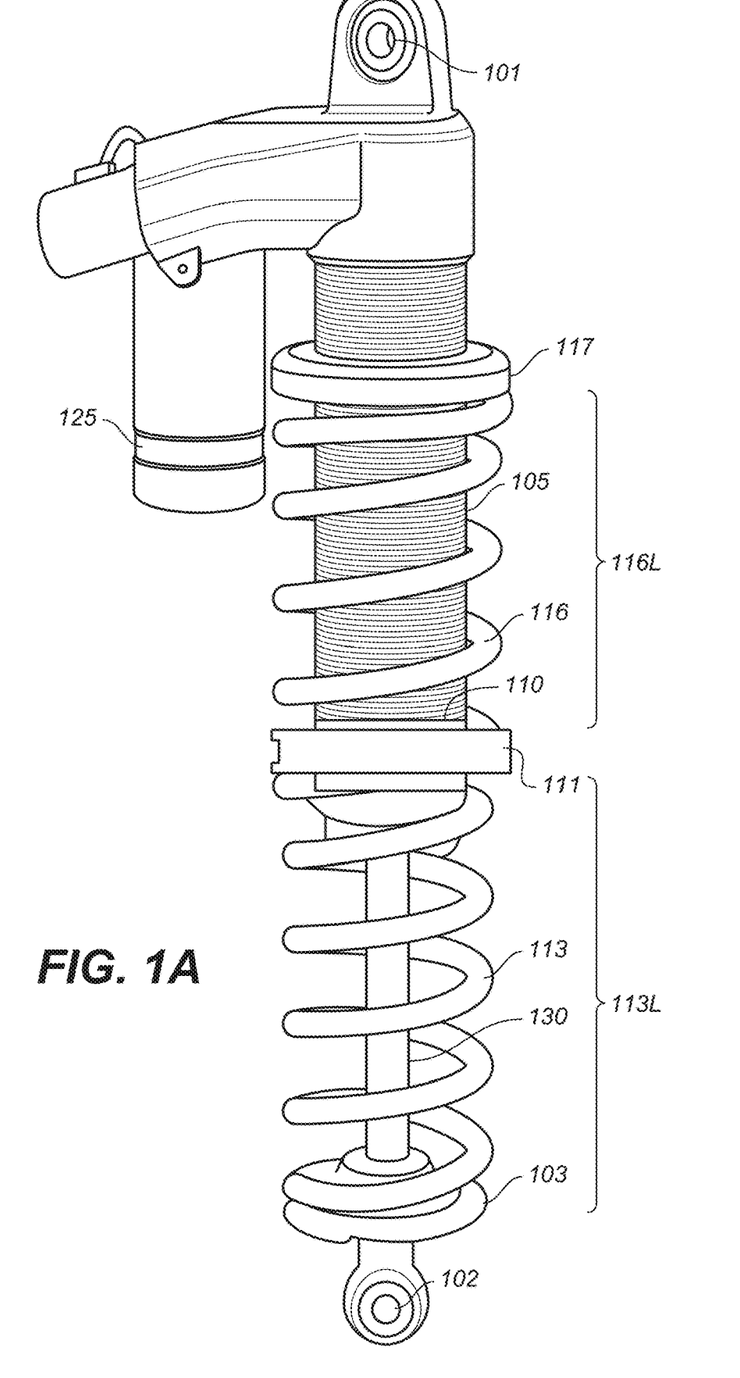
FIG. 1A is a perspective view of a shock assembly with a wear sleeve, in accordance with an embodiment.

With reference now to FIG. 1A, a perspective view of a shock assembly 100 with a wear sleeve is shown in accordance with an embodiment. In one embodiment, shock assembly 100 is a dual spring shock assembly. However, it should be appreciated that in another embodiment, shock assembly 100 may use more than two springs.

In one embodiment, shock assembly 100 includes a shock body 105 with a main chamber and a damping piston coupled with a shaft 130. In one embodiment, shock assembly 100 also includes a spring coupler 111, a primary spring 113, a tender spring 116, a preload flange 117, and the wear sleeve 110.

In one embodiment, shock assembly 100 includes an optional external reservoir 125 having a floating piston and pressurized gas to compensate for a reduction in volume in the main chamber as shaft 130 moves into the shock body. In its basic form, the main chamber works in conjunction with the one or more springs to control the speed of movement of the shaft 130 by metering incompressible fluid from one side of the damper piston to the other (or to and from the optional external reservoir 125) as the damper travels through the main chamber.

In one embodiment, spring coupler 111 is located between primary spring 113 and tender spring 116. In one embodiment, tender spring 116 abuts preload flange 117 at one end and spring coupler 111 at the other and has a resting length 116L. In one embodiment, primary spring 113 abuts spring coupler 111 at one end and lower flange 103 at the other and has a resting length 113L.

In general, a dual-spring type of shock assembly 100 enables an initial lighter stiffness rate for regular operation, but will transition to a harder stiffness rate upon encounter of a compression causing event. For example, in one embodiment, the initial stiffness of shock assembly 100 is set to a relatively soft stiffness. As shock assembly 100 compresses, so will the primary spring 113 and tender spring 116, until a crossover is reached. Once the crossover is reached, tender spring 116 will no longer be part of the spring stiffness calculation and the rest of the spring compression is placed on primary spring 113. At that time, the spring rate is increased to the spring stiffness of primary spring 113. In other words, the stiffness of shock assembly 100 is increased to a firmer stiffness.

In general, in shock assembly 100, the two springs are stacked together and provide a modified initial spring rate. The modified initial spring rate is often defined by (tender spring rate*primary spring rate) divided by (tender spring rate+primary spring rate).

For example, if the tender spring rate is 150 and the primary spring rate is 100, the initial spring rate is (150*100)/(150+100) or 86. This will be the spring rate until the crossover is reached. At that time, the spring rate will change to the primary spring rate of 100. In one embodiment, this is identified by a dual rate: 86/100.

In one embodiment, by adjusting the location of the crossover, the length of the stroke of shock assembly 100 at the first spring rate is defined. For example, if shock assembly 100 has a 12-inch stroke and the crossover is set at 4" of stroke, shock assembly 100 will use the lighter spring rate (E.g., 86) for the first 4 inches of travel and then transition to the heavier spring rate (e.g., 100) for any remaining compression.

In one embodiment, shock assembly 100 also includes upper eyelet 101 and lower eyelet 102 for coupling shock assembly 100 with a suspension system. The upper eyelet 101 and lower eyelet 102 are used for mounting one end of the shock assembly to a static portion of the vehicle and the other end of the shock assembly to a dynamic portion such as a retaining component or assembly that retains a wheel(s) (or ski, track, hull, etc.). Although eyelets are shown, it should be appreciated that the mounting systems may be bolts, welds, or the like, the use of eyelets is provided as one embodiment and for purposes of clarity.

Although the eyelets are labeled as upper eyelet 101 and lower eyelet 102, this is done for purposes of defining relative motion of one or more of the components of shock assembly 100. Thus, it should be appreciated that in one embodiment, (such as an inverted scenario) the mounting of shock assembly 100 could be with the upper eyelet 101 being at a lower point (such as closer to the wheel retaining assembly) while the lower eyelet 102 would actually be at a higher point on the vehicle than upper eyelet 101 (e.g., such as at the frame of the vehicle).

Although a dual-spring type of shock assembly 100 is used in the following discussion, it should be appreciated that in one embodiment, the wear sleeve 110 could be used in a single spring shock assembly and provide protection to the shock body 105 from the single spring or from other impact events such as rocks, branches, roots, curbs, or the like, that may be encountered by the shock assembly.

Figure 1B:
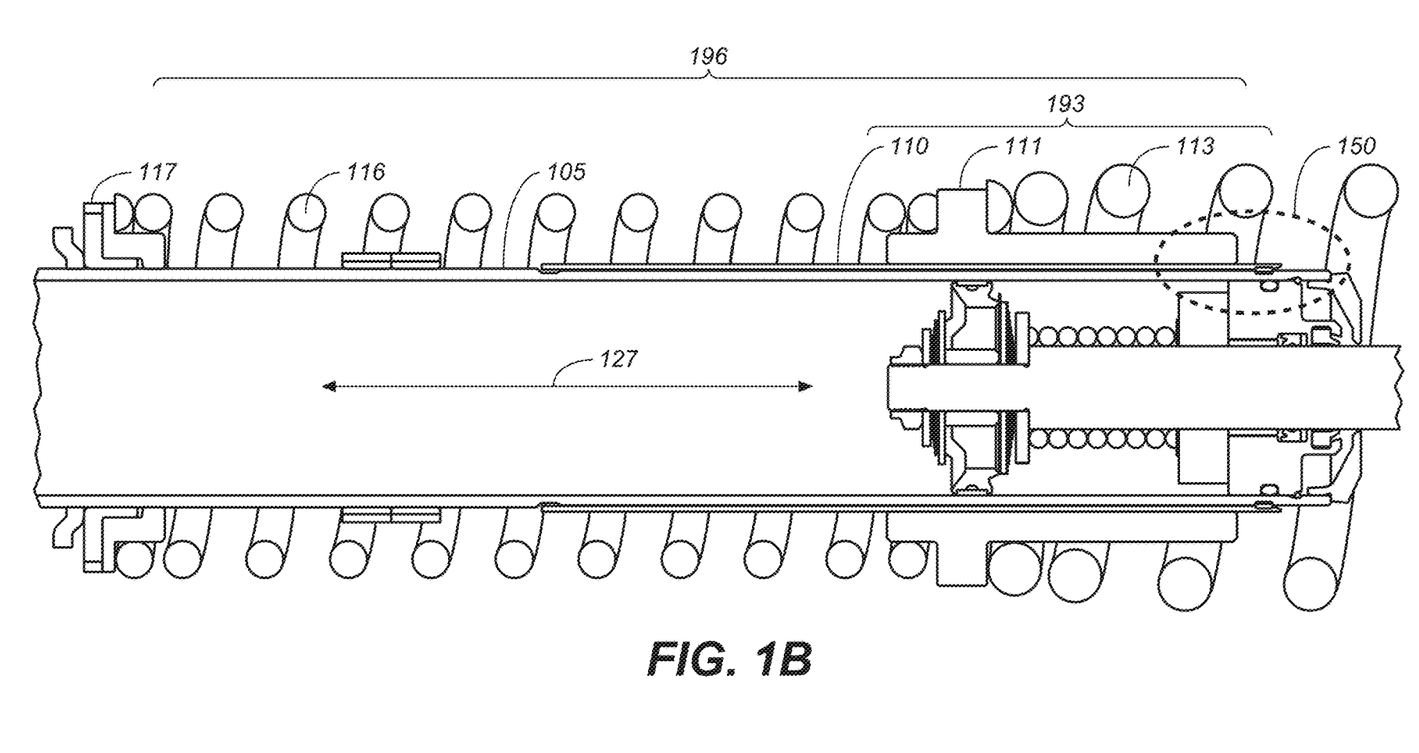
FIG. 1B is a cross-section view of the shock assembly with a wear sleeve, in accordance with an embodiment.

Referring now to FIG. 1B, a cross-section view of a shock assembly 100 with a wear sleeve 110 around a portion of a shock body 105 is shown in accordance with an embodiment. In shock assembly 100, a number of components are shown. However, it should be appreciated that in other embodiments, there may be more or fewer components, the components may be arranged in different configurations, and the like.

In one embodiment, the shock body 105 is aluminum. In one embodiment, the shock body 105 also includes an anodized coating over the aluminum. In another embodiment, the shock body 105 could be made of a different material such as a different metal, composite, or combination thereof.

In one embodiment, during vehicle operation the spring coupler 111 will move axially (e.g., back-and-forth in the axial directions indicated by arrow 127) along a portion of the length of the shock body 105 (e.g., the range of motion 193) as the shock assembly 100 moves through compression and rebound strokes.

For example, when the shock assembly 100 is under compression, the primary spring 113 and/or tender spring 116 will be compressed and spring coupler 111 will move axially (as indicated by arrow 127) along the shock body 105 toward the preload flange 117. When the shock assembly 100 is in a rebound stroke, the primary spring 113 and/or the tender spring 116 will decompress and the spring coupler 111 will move axially (as indicated by arrow 127) along the shock body 105 away from the preload flange 117.

Although the spring coupler 111 is designed to moves axially along the shock body 105, manufacturing tolerances for the primary spring 113 and/or the tender spring 116 can cause imperfect axial motion of the spring coupler 111. This imperfect axial motion of spring coupler 111 can cause friction between spring coupler 111 and a portion of shock body 105.

Moreover, in a muddy (gravely, sandy, or the like) environment, small particles can make their way between the spring coupler 111 and the shock body 105 to increase the friction (and thus the wear) that is occurring between the spring coupler 111 and the shock body 105. Further, any damage to the primary spring 113 and/or the tender spring 116 can also increase the imperfect axial motion of the spring coupler 111.

In one embodiment, the wear sleeve 110 is placed between the spring coupler 111 and the shock body 105 such that the friction (and thus the wear) from the motion of spring coupler 111 and any particles thereunder are moved from shock body 105 to wear sleeve 110.

In one embodiment, the wear sleeve 110 has an inner diameter (ID) that is larger than an outer diameter (OD) of the shock body 105 such that the wear sleeve 110 will fit around the exterior portion of the shock body 105. The wear sleeve 110 also has an OD that is smaller than the ID of spring coupler 111 (and also the ID of the primary spring 113, the tender spring 116, etc.) such that wear sleeve 110 will fit around the exterior portion of the shock body 105 while fitting inside of the spring coupler 111 (and in one embodiment, the primary spring 113, tender spring 116, etc.).

In one embodiment, wear sleeve 110 will extend axially (as shown by arrow 127) along the shock body 115 at least as far as a range of motion 193 of the spring coupler 111. In one embodiment, wear sleeve 110 will extend axially (as shown by arrow 127) along the entire length of shock body 115 as shown by length 196. In one embodiment, wear sleeve 110 will extend axially (as shown by arrow 127) along some length of shock body 115 that is less than the full length indicated by length 196 and more than the range of motion 193 length.

By installing wear sleeve 110 into shock assembly 100, instead of having the spring coupler 111 in frictional contact with shock body 105, the spring coupler 111 will be in frictional contact with wear sleeve 110 while wear sleeve 110 is fixed in position about shock body 105. In so doing, the wear sleeve 110 provides wear resistance between the shock body 105 and any shock assembly 100 components that are outside of the OD of the wear sleeve 110 (e.g., spring coupler 111, primary spring 113, tender spring 116), such that the previously occurring wear (or friction) on the shock body 105 will now occur on wear sleeve 110.

This previously occurring wear (or friction) will include the friction caused by any imperfect axial motion of the spring coupler 111, any damage to the primary spring 113 and/or the tender spring 116 that will cause additional imperfect axial motion of the spring coupler 111, small particles make their way between the spring coupler 111 and wear sleeve 110, and the like.

Thus, wear sleeve 110 will be the recipient of the friction (or wear) that would otherwise occur between the spring coupler 111, primary spring 113 and/or the tender spring 116 and the shock body 105.

Figure 1C:
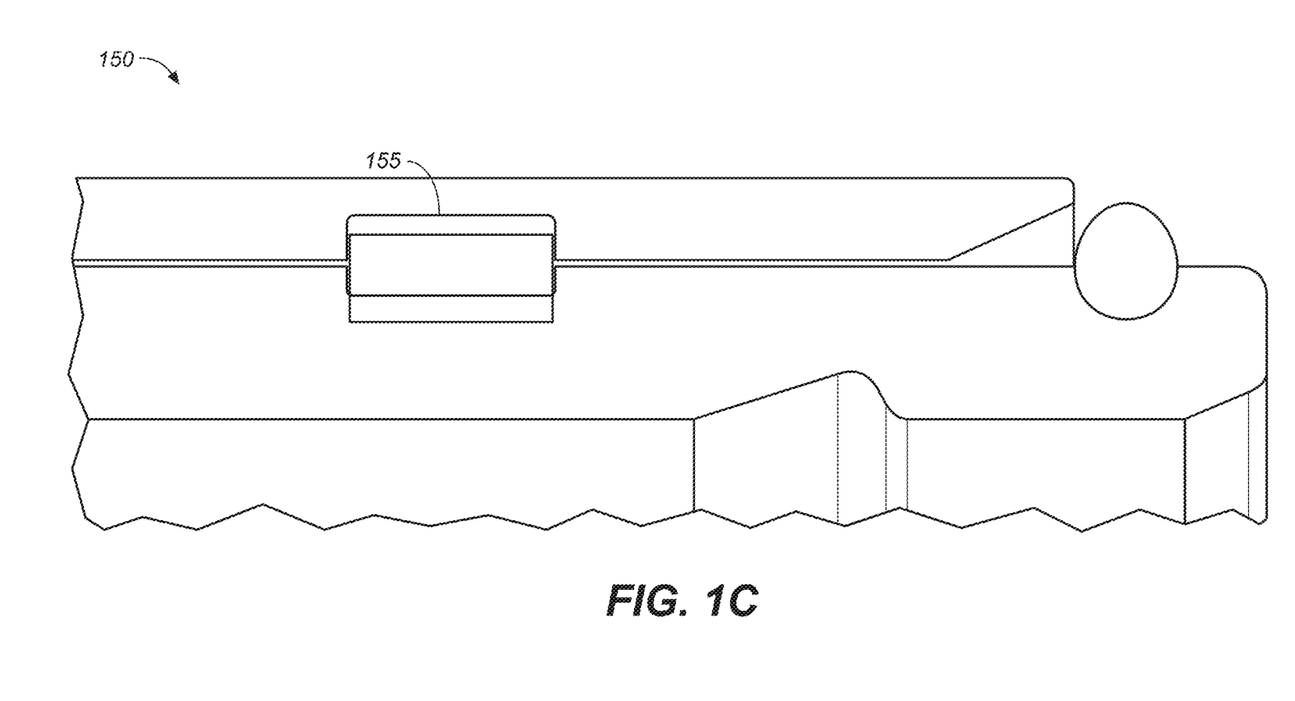
FIG. 1C is a detail view of a retaining feature for retaining the wear sleeve, in accordance with an embodiment.

In one embodiment, wear sleeve 110 is installed between shock body 105 and spring coupler 111 (and in one embodiment a portion of primary spring 113, and or some or all of the tender spring 116) and held in a fixed position with respect to shock body 105 by a retaining feature 155 which is shown in further detail in FIG. 1C.

In one embodiment, the thickness of wear sleeve 110 is approximately 45 thousandths of an inch. In one embodiment, the wear sleeve 110 is steel. In one embodiment, the wear sleeve 110 is stainless steel. In one embodiment, wear sleeve 110 is a metal such as aluminum, titanium, copper, brass, steel, or the like. In one embodiment, wear sleeve 110 is coated with a protective coating such as a melanite coating (e.g., carbon nitriding) or the like.

In one embodiment wear sleeve 110 is comprised of a composite material such as, but not limited to, glass filled nylon (such as for example, 33% glass reinforced Nylon 6/6), injection molded carbon fiber, carbon fiber with reinforced nylon, compression molding, composite layering, nylon reinforced with carbon fibers, chopped carbon fibers, a plastic, polymer, other long fiber-reinforced plastics, or the like.

In one embodiment, wear sleeve 110 could be formed from a combination of materials such as an outer harder layer such as steel and an inner composite material. In one embodiment, by forming the wear sleeve 110 from a combination of materials, the outer portion of wear sleeve 110 would have the increased wear resilience while the overall weight of wear sleeve 110 would be reduced.

With reference now to FIG. 1C, a detail view 150 of FIG. 1B is shown in accordance with one embodiment. In one embodiment, detail view 150 shows a retaining feature 155 used to retain wear sleeve 110 at a fixed position/location on shock body 105.

For example, in one embodiment, wear sleeve 110 will have an indent (crimp, tab, etc.) and a retaining feature 155 will be fixedly coupled with shock body 105. As such, when wear sleeve 110 is placed on shock body 105 it will slide along shock body 105 until the indent in wear sleeve 110 encounters retaining feature 155 on shock body 105. At that point, wear sleeve 110 will be fixedly coupled with shock body 105 in the designated position.

In one embodiment, shock body 105 will have an indent (crimp, tab, etc.) and wear sleeve 110 will have a retaining feature 155. As such, when wear sleeve 110 is placed on shock body 105 it will slide along shock body 105 until the retaining feature 155 of wear sleeve 110 encounters the indent on shock body 105. At that point, wear sleeve 110 will be fixedly coupled with shock body 105 in the designated position.

In one embodiment, retainer 155 is a snap ring retainer. In one embodiment, retainer 155 is another type of retaining feature for retaining the fixed position of wear sleeve 110 with respect to the shock body 105. In one embodiment, retainer 155 could be a crimp, tab, indent, or the like, feature that is used at one or both of the wear sleeve 110 and shock body 105 to retain the position/location of wear sleeve 110 with respect to shock body 105.

Figure 2A:
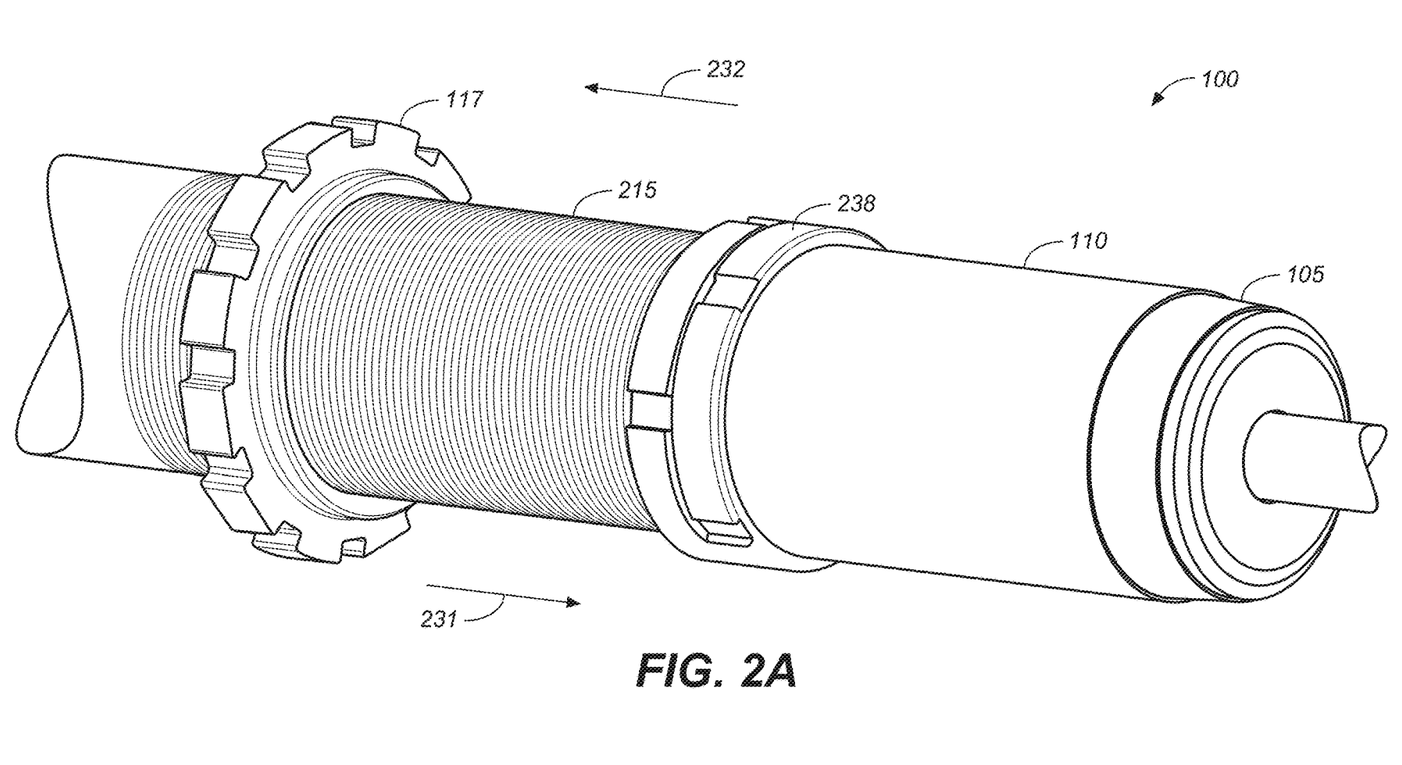
FIG. 2A is a perspective view of a shock assembly with a crossover ring retained adjustable wear sleeve, in accordance with an embodiment.

Referring now to FIG. 2A, a perspective view of a shock assembly 100 with an adjustable wear sleeve 110 having a crossover ring 238 coupled therewith is shown in accordance with an embodiment. In one embodiment, shock body 105 includes a surface features such as threaded section 215.

In one embodiment, threaded section 215 traverses a portion of the exterior surface of shock body 105. In one embodiment, threaded section 215 is formed on shock body 105 during the manufacture of shock body 105. Although one embodiment discusses a threaded section 215, in another embodiment, instead of threads, the surface feature could be ridges, indents, or the like.

In general, the crossover ring 238 includes an adjustable setting capability that allows a user to change the location of wear sleeve 110 with respect to shock body 105. For example, the location of wear sleeve 110 is adjusted by rotating the crossover ring 238 axially around shock body 105 along the threaded section 215.

For example, when the crossover ring 238 is rotated clockwise about shock body 105, the threaded section 215 will cause the crossover ring 238 and wear sleeve 110 to move in direction 232. In contrast, when the crossover ring 238 is rotated anti-clockwise about shock body 105, the threaded section 215 will cause the crossover ring 238 and wear sleeve 110 to move in direction 231.

Figure 2B:
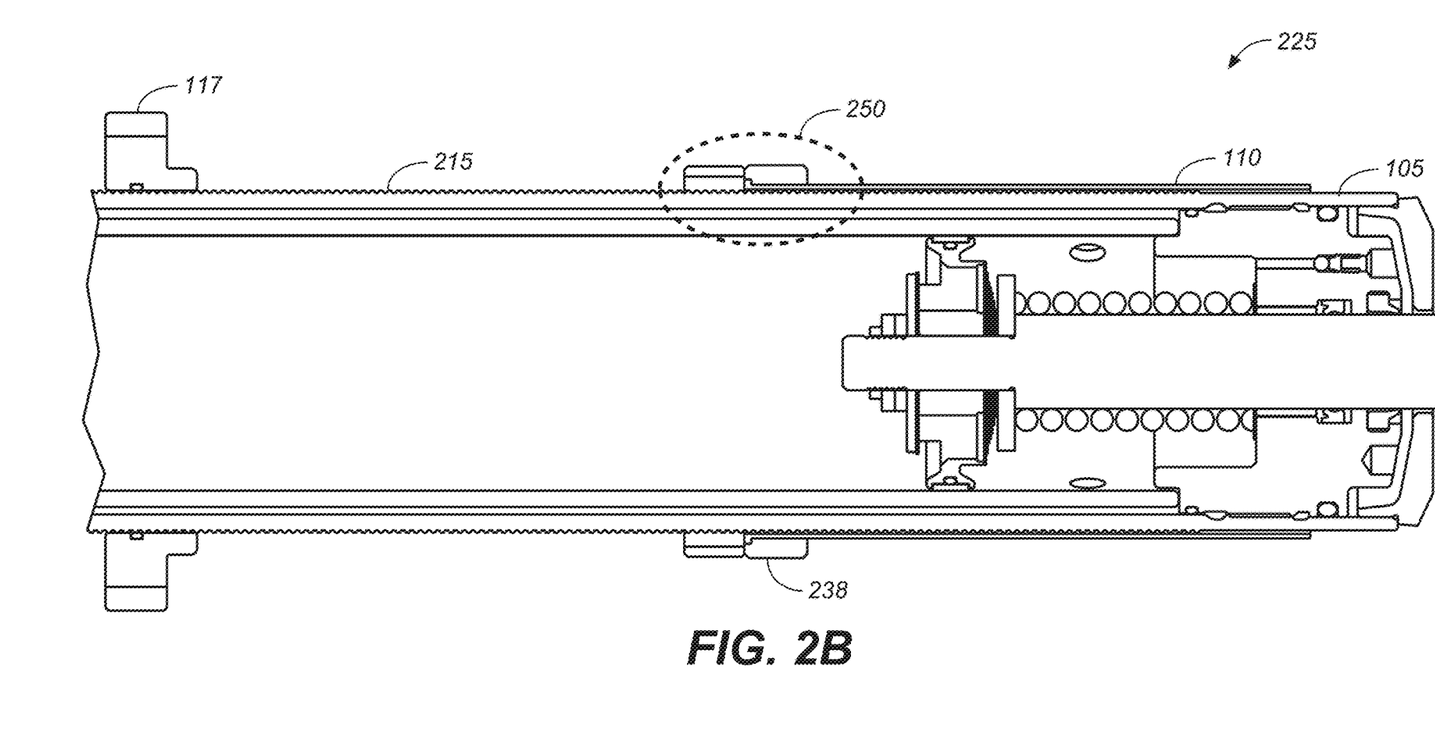
FIG. 2B is a cross-section view of the shock assembly with crossover ring retained adjustable wear sleeve of FIG. 2A, in accordance with an embodiment.

With reference now to FIG. 2B, a cross-section view 225 of the shock assembly 100 with the adjustable crossover ring 238 retained wear sleeve 110 of FIG. 2A is shown in accordance with an embodiment. In one embodiment, using threaded crossover ring 238 to retain the wear sleeve 110 will provide a level of adjustability for wear sleeve along the threaded section 215 of shock body 105 that will be available to a mechanic, an end user, or the like.

In one embodiment, by using threaded crossover ring 238 to adjustably couple wear sleeve 110 with the shock body 105, the wear sleeve 110 will be retroactively compatible with threaded shock bodies, such as, for example shock bodies with different diameters (e.g., 2.5, 3.0, etc.) and the like. Moreover, since the wear sleeve 110 is coupled with the shock body 105 by threading the crossover ring 238 along the existing threaded section 215, the location of the wear sleeve 110 is adjustable with respect to the shock body 105.

Figure 2C:
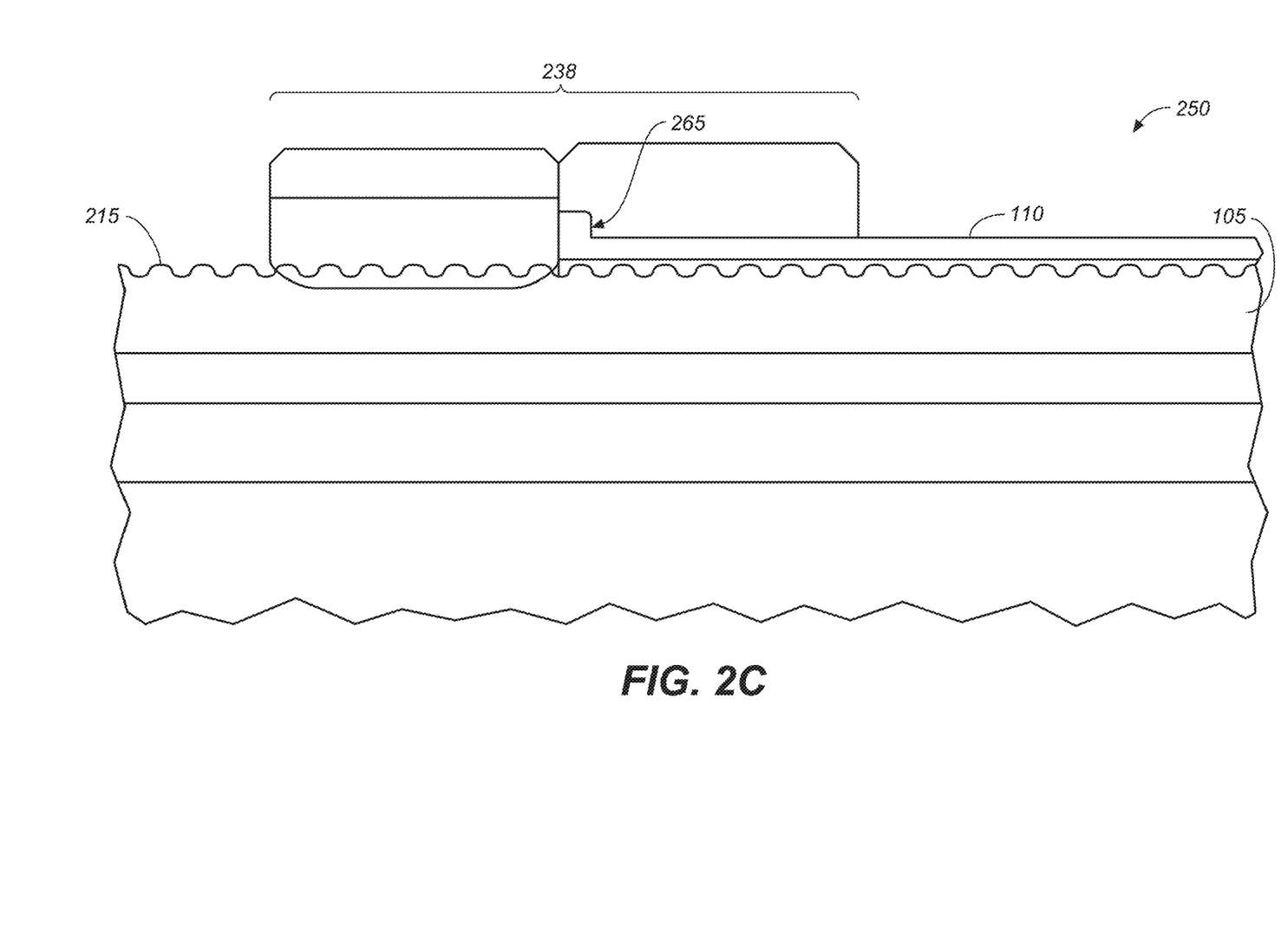
FIG. 2C is a detail view of the crossover ring retaining the wear sleeve of FIG. 2B, in accordance with an embodiment.

In addition, since the shock body 105 of FIG. 2A-2C already includes a threaded section 215 used by preload flange 117 to adjust the preload. Shock body 105 does not need to be customized for the application of the wear sleeve 110 to be added thereto. Instead, in one embodiment, the shock body 105 is a standard part set. Thus, in one embodiment, the wear sleeve 110 coupled with the crossover ring 238 can be incorporated into any existing shock assembly 100 with a threaded shock body 105. In one embodiment, the incorporation of the wear sleeve 110 into an existing shock body would include a replacement of a preexisting crossover ring with the crossover ring 238.

In one embodiment, a limit is provided with shock assembly 100 to stop a user from adjusting the end of the wear sleeve 110 off of the shock body 105 and thereby possibly contacting the spring retainer from the rod end of the shock assembly 100.

Referring now to FIG. 2C, a detail view 250 of the crossover ring 238 retaining the wear sleeve 110 of FIG. 2B is shown in accordance with an embodiment. In one embodiment, the wear sleeve 110 has a bent end portion 265. In one embodiment, crossover ring 238 is fixedly coupled with the wear sleeve 110 using a bent end portion 265 that is held by crossover ring 238.

Figure 3:
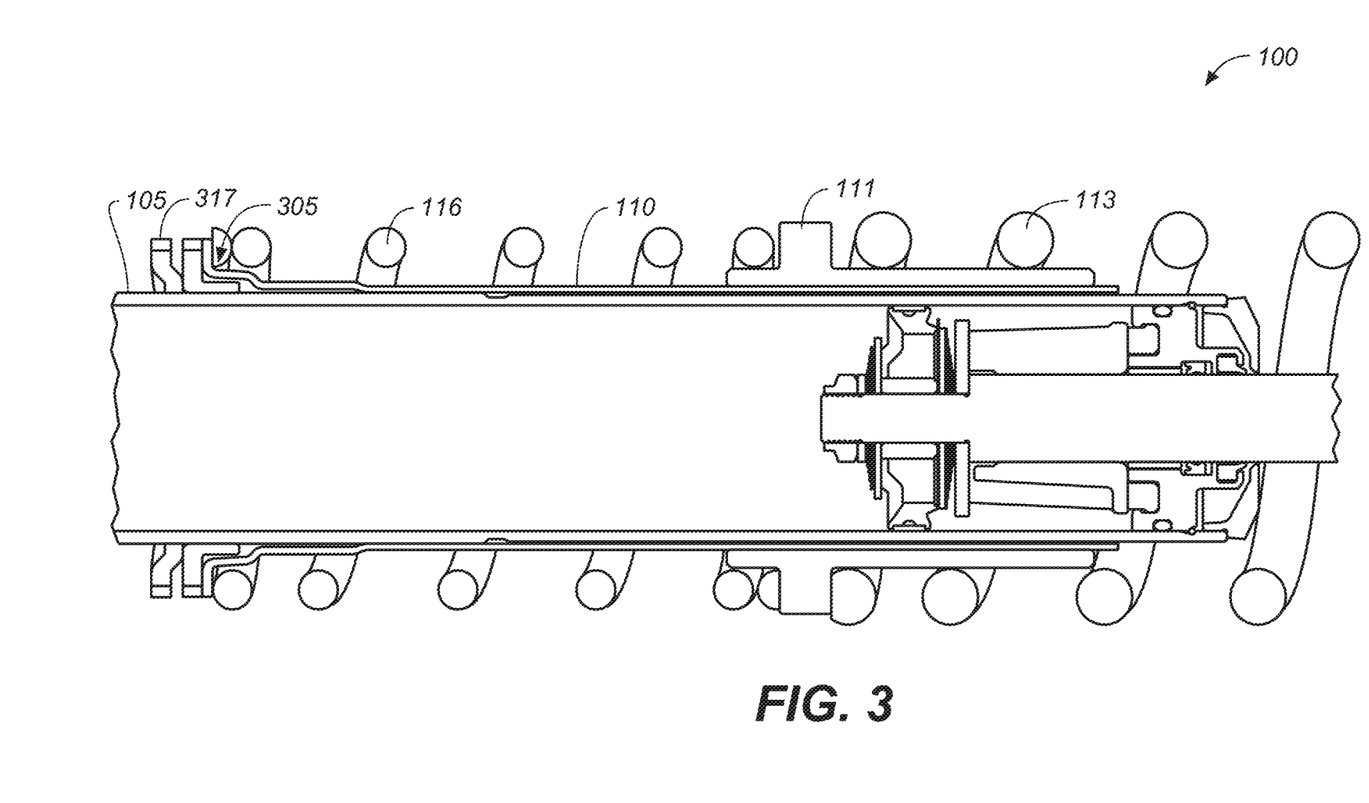
FIG. 3 is a cross-section view of a shock assembly with a non-adjustable wear sleeve replacing a spring adapter and held in place by spring preload, in accordance with an embodiment.

With reference now to FIG. 3, a cross-section view of a shock assembly 100 with a non-adjustable wear sleeve 110 about at least a portion of the shock body 105 is shown in accordance with an embodiment. In general, many of the components of FIG. 3 are similar to those of FIGS. 1A-2C, and as such, the discussion of the similar parts and their operation is not repeated for purposes of clarity, but is incorporated herein by reference.

In one embodiment, shock assembly 100 of FIG. 3 replaces an existing component (e.g., a spring adapter) with the preload ring 317. In one embodiment, wear sleeve 110 has a tab 305 that allows the wear sleeve 110 to be non-adjustably held in place about the shock body 105 by the spring preload force from an external spring (such as tender spring 116) against the preload ring 317. In general, the embodiment of FIG. 3 is useful in shock assemblies that use a coil bound tender (e.g., shock assemblies that don't have crossover rings).

In one embodiment, an added benefit of wear sleeve 110 is that the shock body 105 can be customized (e.g., lightened, reduced in thickness, etc.). For example, the addition of the wear sleeve 110 provides a layer of wear resistance as well as an amount of puncture resistance from external items (such as rocks, branches, curbs, etc.) to shock body 105.

In one embodiment, the performance goals of wear sleeve 110 can be used as a factor for the material(s) used to make wear sleeve 110, the thickness of wear sleeve 110, the overall length of wear sleeve 110, the method for coupling wear sleeve 110 with shock body 105, and the like. For example, a wear sleeve 110 for a road bike used by an amateur rider may include a design criterion where the weight is valued more than an expected lifespan, the length of wear sleeve 110 along shock body 105 is slightly larger than the expected travel of spring coupler 111 (e.g., 30%), and cost is an important factor. In contrast, in a wear sleeve 110 for a road bike used by a professional rider, a design criterion may be based on weight, where cost is somewhat important, the length of wear sleeve 110 along shock body 105 is minimally larger than the expected travel of spring coupler 111 (e.g., 10%), and the expected lifespan is reduced to the length of a race (or two races, etc.).

In one embodiment, the wear sleeve 110 for an average mountain bike used by an amateur rider would include a design criterion where the expected lifespan is valued more than the weight, the length of wear sleeve 110 along shock body 105 is quite a bit larger than the expected travel of spring coupler 111 (e.g., 55% larger) to also reduce wear to shock body 105 from, rocks, branches, primary spring 113 and/or the tender spring 116, etc., and cost is also an important factor.

In contrast, in the wear sleeve 110 for a mountain bike used by a professional rider, a design criterion may be based on protection, e.g., the length of wear sleeve 110 along shock body 105 is quite a bit larger than the expected travel of spring coupler 111 (e.g., 75% larger) to also reduce wear to shock body 105 from rocks, branches, primary spring 113 and/or the tender spring 116, etc., where cost and weight are somewhat important, and the expected lifespan is reduced to the length of a race weekend, a season, or the like.

Therefore, in one embodiment, the design of the wear sleeve 110 may be modified by different material use, different durability life, a different temperature stability threshold, designed to work with non-standard springs (having different (IDs) than the standard springs used by the platform, etc. In other words, in one embodiment, the thickness, material, and manufacture of wear sleeve 110 would be different based on different use cases, rider preferences, tolerances, purchase price, and the like.

For example, in one embodiment, wear sleeve 110 could be formed from a lightweight material that provides the wear protection for shock body 105 but has a reduced durability lifespan as compared to a wear sleeve 110 formed from a heavier material. A composite or lightweight wear sleeve 110 would be significantly lighter than a heavier steel wear sleeve 110, but would likely have much faster wear characteristics. As such, the user could optionally select the lighter weight wear sleeve 110 with the understanding that it will have to be replaced more often than a heavyweight wear sleeve 110.

Moreover, different wear sleeve 110 features would also include different replacement intervals. The wear intervals could be materially based and include aspects such as, but not limited to, after a given time period, after a number of hours of use, when imbedded wear indicators appear (or make noise, etc.), when visible wear is identified, and the like. Moreover, the wear intervals could also be adjusted based on environmental (or terrain) use such as on-road use, off-road use, sand, gravel, mud, silt, dirt, water, etc. For example, the wear sleeve 110 will have a longer use life in an on-road environment and a shorter expected life use in a muddy off-road environment. In another example, a racer might require a higher temperature stability in the wear sleeve 110 than a casual rider.

Thus, in one embodiment, the manufacturer could provide a number of different wear sleeve 110 material options that would allow a user to select the desired option based on weight, wear characteristic, replacement intervals, temperature stability thresholds, expected or most often encountered environments/terrains, non-standard spring use, and the like. For example, a road rider may want to use a lighter weight wear sleeve 110 which would have an expected useful lifespan of 1-3 years in an on-road environment, while a motocross rider would not use the same lighter weight wear sleeve 110 because it would have an expected useful lifespan of a month in a muddy, sandy, gritty, off-road environment. In another example, a Baja Racer may use a heavier weight wear sleeve 110 because shock body 105 protection is valued higher than weight saving.

In one embodiment, wear sleeve 110 has performance goals such as, at least a 5000-mile durability life, an adjustable preload, an adjustable crossover, is temperature stable to at least 350 degrees Fahrenheit, and can work with standard springs (having IDs used by the platform). In other words, the wear sleeve 110 would not extend the OD of the shock body to an OD that did not operationally fit within the ID of the standard spring(s).

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A shock assembly comprising:
   a shock body with a shock body outer diameter (OD);
   a spring coupler with a spring coupler inner diameter (ID), a spring coupler OD, and a spring coupler range of motion, said spring coupler to move back and forth axially about a portion of said shock body a distance of said spring coupler range of motion;

a wear sleeve comprising:
- a wear sleeve ID larger than said shock body OD;
- a wear sleeve OD smaller than said spring coupler ID, such that said wear sleeve is located between said shock body and said spring coupler; and
- a wear sleeve axial length, said wear sleeve axial length corresponding to said distance of said spring coupler range of motion, said wear sleeve comprised of stainless steel a threaded section of said shock body;

a threaded crossover ring adjustably coupleable with said threaded section of said shock body; and an end portion of said wear sleeve fixedly coupled with said threaded crossover ring, such that a location of said wear sleeve is adjustable with respect to said shock body.

2. The shock assembly of claim 1, further comprising:

a retaining feature to fixedly couple said wear sleeve with said crossover ring.

3. The shock assembly of claim 2, further comprising a portion of said retaining feature is on said crossover ring and is selected from a group consisting of: a crimp, a tab, and an indent.

4. The shock assembly of claim 2, further comprising a portion of said retaining feature is on said wear sleeve and is selected from a group consisting of: a crimp, a tab, and an indent.

\* \* \* \* \*